United States Patent [19]
Beauchamp et al.

[11] Patent Number: 5,535,967
[45] Date of Patent: Jul. 16, 1996

[54] FLOATING SPEED ELECTRICALLY DRIVEN SUCTION SYSTEM

[75] Inventors: Edward D. Beauchamp, Lakewood; Joseph Denk, Manhattan Beach; Roger P. Murry, San Pedro, all of Calif.

[73] Assignee: AlliedSignal Inc., Morris Township, N.J.

[21] Appl. No.: 170,576

[22] Filed: Dec. 20, 1993

[51] Int. Cl.$^6$ ................................................. B64C 21/06
[52] U.S. Cl. .................................... 244/209; 244/53 R
[58] Field of Search ................................ 244/204, 209, 244/53, 58; 310/113; 417/411

[56] References Cited

U.S. PATENT DOCUMENTS

| | | |
|---|---|---|
| 2,867,392 | 1/1959 | Lear ........................................... 244/209 |
| 3,226,619 | 12/1965 | Block ........................................ 417/411 |
| 3,276,674 | 2/1964 | Hens . |
| 3,556,678 | 1/1971 | Oishi et al. ........................... 417/411 X |
| 3,737,246 | 6/1973 | Shirato et al. . |
| 3,751,192 | 8/1973 | Boyd ........................................ 417/411 |
| 4,462,561 | 7/1984 | Cronin . |
| 4,780,049 | 10/1988 | Palmer et al. . |
| 4,949,276 | 8/1990 | Staroselsky et al. . |
| 5,114,103 | 5/1992 | Coffinberry . |
| 5,143,329 | 9/1992 | Coffinberry ............................. 244/209 |
| 5,222,698 | 6/1993 | Nelson et al. . |

Primary Examiner—William Grant
Attorney, Agent, or Firm—James W. McFarland

[57] ABSTRACT

A floating speed electrically driven suction system for sucking boundary layer air flow off the external surface of an aircraft. A variable speed electrical generator drives a variable speed electrical motor which in turn drives a variable speed pneumatic compressor. Inlet guide vanes are automatically adjustable to compensate for variations in pressure. A surge control valve is operable to port in additional inlet flow as needed to avoid low volumetric surge in the suction compressor.

19 Claims, 2 Drawing Sheets

FLOATING SPEED ELECTRICALLY DRIVEN SUCTION SYSTEM

TECHNICAL FIELD

This invention pertains to boundary layer flow on major surfaces of aircraft, and it relates more particularly to a suction system for drawing off the boundary layer for improving laminar flow across the aircraft surface for drag reduction.

BACKGROUND OF THE INVENTION

Turbulent flow across the major surfaces of an aircraft dramatically increases fluid drag. If the boundary layer fluid flow across the aircraft surface can be maintained substantially laminar, such drag is dramatically reduced.

SUMMARY OF THE INVENTION

It is an important object of the present invention to provide a suction system for drawing off boundary layer flow from large surfaces of aircraft in order to maintain such boundary layer flow substantially laminar to reduce drag on the aircraft.

More particularly, the present invention contemplates such a system wherein an electric motor driven compressor draws off the boundary layer airflow from the surface of the aircraft wing. Importantly the present invention contemplates a permanent magnet, three-phase generator mechanically driven by the aircraft main engine, and electrically coupled to drive an induction motor driving the compressor.

Another important invention is to provide a simplified control and drive system of the type described wherein the generator may be directly connected to the induction motor without any electrical conditioning, and the compressor having variable inlet guide vanes and surge control to accommodate the variation in generator and motor output power, and to avoid low volumetric flow surge conditions.

These and other objects and advantages of the present invention are specifically set forth in or will become apparent from the following detailed description of a preferred embodiment of the invention, when read in conjunction with the accompanying drawings.

DETAILED DESCRIPTION OF THE PREFERRED EMBODIMENT

Figure 1:
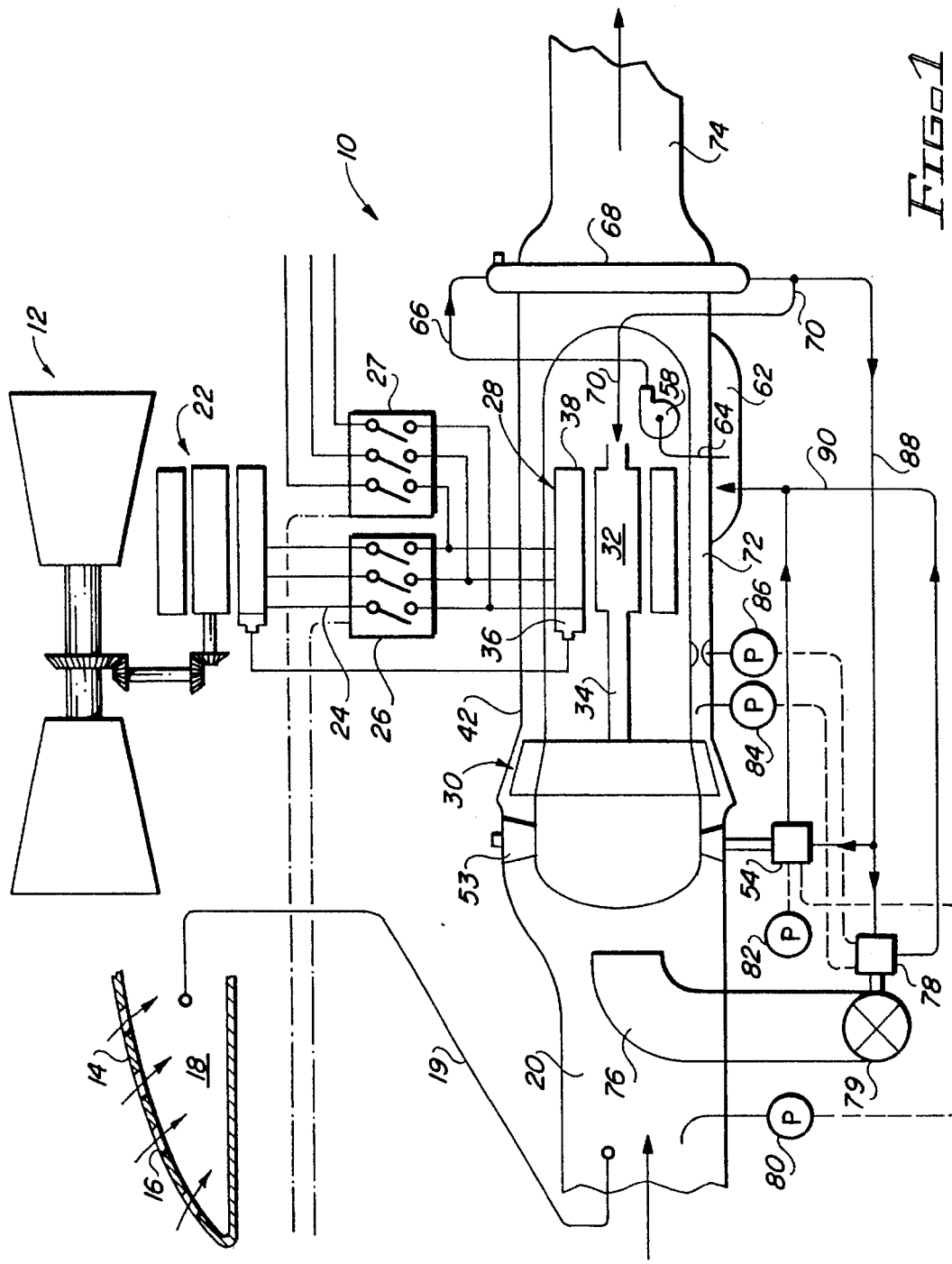
FIG. 1 is a schematic representation of a suction system as contemplated by the present invention.

Incorporated herein by reference are the disclosures as set forth in U.S. Pat. Nos. 4,667,123; 4,709,180; 4,741,094; and 4,852,245 to the extent necessary for full disclosure of a permanent magnet generator drive as contemplated for use in the system of the present invention.

Referring now more particularly to the drawings, a suction system 10 as contemplated by the present invention is illustrated in conjunction with the prime mover engine 12 of an aircraft along with a portion of a major surface such as the wing 14 of the aircraft. By appropriate use of openings 16 on the aircraft surface, the boundary layer flow there across may be sucked into an interior chamber or cavity 18 thereof for subsequent entry into an inlet duct 20 of suction system 10. The gas turbine main engine 12 of the aircraft directly mechanically drives a permanent magnet motor generator 22. Reference may be made to the above mentioned patents for a full and complete description of the generator contemplated for use in the present system. Such a high speed, high powered, toothless permanent magnet generator produces a nonrectified, noninverted, low reactance power alternating current power supply delivered through output leads 24 to a contact switch 26. Importantly, the permanent magnet generator 22 is directly coupled to the main engine 12 for simplicity, thereby producing a syncronous electrical output having an output frequency varying with the speed of the aircraft engine. It is noted that in a typical duty cycle for a long haul aircraft, the engine speed adjusts more than thirty percent throughout the trip just merely to accommodate changing aircraft weight as fuel is consumed.

An important aspect of the present invention is utilization of an induction motor 28 which is electrically coupled to the generator 22 upon closure of the contacts 26 to deliver nonconditioned electrical power to the induction motor. This nonrectified, noninverted, but low reactance, unconditioned electrical power delivered to the induction motor allows such induction motor to, in a lagging sense, follow the power curve created by the generator 22 as the induction motor gradually rises in speed. The load on induction motor 28 provided by the suction system 10 (described in greater detail below) varies linearly with ambient air density as well as with the cube of shaft speed. Laminar flow suction is intended for use above 28,000 ft. altitude, where the ambient air density is 40% of the value at sea level. The direct electrical coupling provides a vastly simplified suction system inasmuch as there are included no electronics for conditioning the output power from the variable speed permanent magnet generator 22. Rather, the only control is the switching contacts 26 themselves. That is, the permanent magnet generator creates an alternating current, variable frequency, variable voltage power output that is generally proportional to engine speed, and in the range of approximately 100 kilowatts. Such high level electrical power is delivered directly to the induction motor which, in lagging fashion follows the permanent magnet generator to drive a high speed, high power compressor 30.

The permanent magnet generator 22 is discussed in greater detail in the U.S. patent references noted above. Briefly, generator 22 is constructed using a diametrically magnetized permanent magnet rotor within a nonmagnetic support structure, a toothless stator assembly having a nonmetallic winding support wound with Litz wire, and a laminated flux collector ring positioned on the outside of the windings to provide a nonsalient flux return circuit. The utilization of a toothless stator and a unity permeability rotor construction for the high speed direct engine driven generator results in very low source impedance with high short circuit ratio. The high current capability is required for the proper startup of the directly electrically connected low slip induction motor 28 that requires approximately five times rated current for starting inrush.

Figure 2:
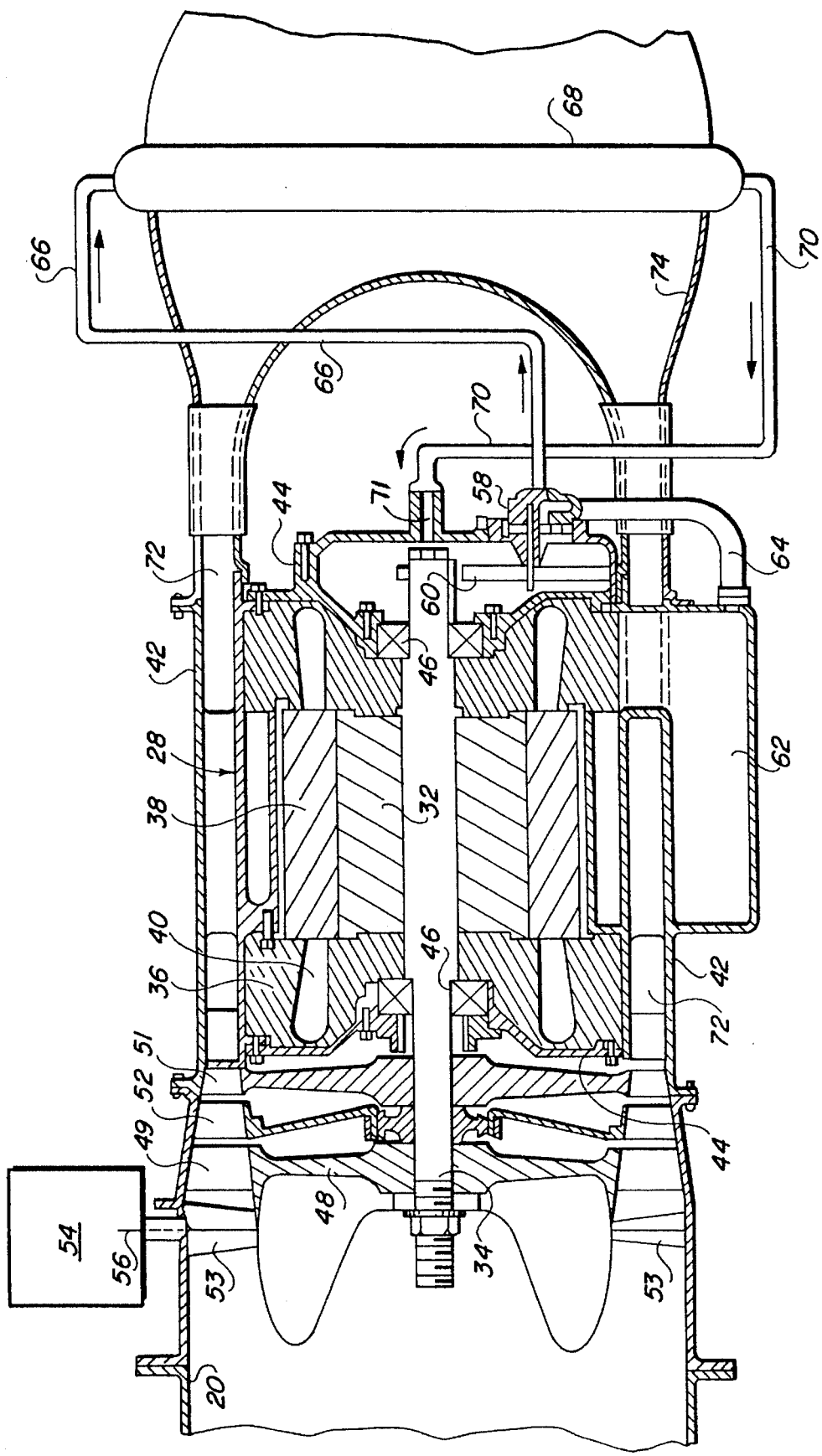
FIG. 2 is a partial plan cross-sectional view of the induction motor and compressor portion of the system of the present invention.

The conventional multi-phase electrical induction motor 28 includes a rotor 32 rigidly secured to a power shaft 34, along with a stator 36, stator laminations 38, and stator winding denoted by the numeral 40 (FIG. 2). Additionally the rotor 32 is of high-conductivity copper allowing the motor 28 to operate at a very low minimial slip (less than 0.08%) at a design power point of 100 kilowatts or more.

As depicted in both FIGS. 1 and 2 the overall suction compressor structure includes an outer housing 42 and associated supports 44 for carrying bearings 46 that journal the central drive shaft 34. Disposed at the leftward end of the drive shaft are compressor means, illustrated in the form of a pair of axial compressor wheels 48, 50, having associated compressor blading 49, 51 at the outer periphery thereof. In the embodiment illustrated a set of stator vanes 52 are interposed between the two axial compressors 48, 50. Situated in the inlet to the first compressor wheel 48 is a ring of adjustable inlet guide vanes 53 and an associated guide ring actuator 54. Though not illustrated, actuator and control 54 may be of conventional structure including a ring gear which may be driven to simultaneously rotate the array of inlet guide vanes about their vertical axis 56 in order to adjust the inclination thereof to alter the amount of preswirl imparted to the incoming air flow being received in the inlet 20.

In the arrangement illustrated, the compressor system further includes a dedicated oil lubrication system including a mechanical oil pump 58 driven by the drive shaft 46 through gearing 60. The oil pump 58 receives oil from sump 62 through duct 64, generating a high pressure output lubricating flow through output duct 66 to enter a heat exchanger 68 disposed across housing 42 at a location in the downstream flow from the compressor. The subsequently cooled, pressurized lubricating flow passes through duct 70 to a boss 71 to be delivered to the interior for lubrication of the bearings 46 and other rotating components. Cooling airflow for the heat exchanger 68 is afforded by the annular, ring-like ducting 72 carrying the discharge of compressed airflow leaving the last compressor wheel 50 in surrounding relation to the centrally located motor 28 to reach the exhaust or discharge duct 74.

For purposes of surge control as described in greater detail below, the compressor suction system further includes a second conduit 76 which receives ambient air flow externally from the aircraft and delivers the same, in parallel flow relationship to conduit 19, to the inlet to compressor 30.

The system further includes, in addition to the guide vane actuator and control 54 adjusting the inlet guide vanes 53, a surge control valve 78 operable to open and close the second conduit 76. The control means further includes a first pressure sensor 80 operable to sense inlet pressure being suctioned in through first conduit 19 into inlet 20. During normal operation this inlet pressure will be substantially less than the external ambient pressure which is sensed by a sensor 82. The pressures sensed by sensors 80, 82 are delivered to the guide vane control actuator 54. Guide vane actuator 54 is operable to compare the two sensed pressures 80, 82 and to adjust the inlet guide vanes 53 so as to maintain the ratio of the difference in pressures 80, 82, in comparison to inlet pressure 80, substantially constant. That is, guide vane actuator 54 is operable to adjust the preswirl cause by inlet guide vanes 53 to maintain the ratio $\Delta P/P$ substantially constant. In this ratio, P stands for compressor inlet pressure, and $\Delta P$ is equal to the quantity: ambient pressure minus compressor inlet pressure. Surge control valve 78 is operable to open and close fluid communication through duct 76 dependent upon the rate of air flow being discharged from compressor 30. To this end, sensors 84, 86 respectively sense the dynamic and hydrostatic pressure of fluid being discharged through conduits 72. By well-known relationship, the difference between total pressure and static pressure in the discharge duct 72 is indicative of the volumetric rate of fluid air flow being discharged there through. Surge control 78 is operable to maintain the valve 79 closed in normal operation, and effective to open valve 79 to allow entry of ambient pressure flow through the second duct 76 to the inlet of the compressor, whenever compressor discharge airflow drops below a preselected level which is indicative of impending surge conditions on the compressor.

The controls illustrated are hydromechanical in nature although a variety of different controls could be utilized. The controls utilize hydraulic power for actuating and driving the control valve 79 and the guide vane actuators 54, and therefore include a conduit 88 delivering pressurized fluid flow to both the surge control 78 and guide vane actuator control 54. Return hydraulic fluid flow through duct 90 is directed to sump 62. In this manner the present invention provides a compact, self contained compressor suction system.

In operation, the compressor suction system is energized merely by closing switch 26 to electrically connect the generator 22 to motor 28. Typically this will occur when the engine 12 is at operating speed. As noted, the speed of engine 12 and thus the frequency and amplitude of electrical current delivered to motor 28 will vary substantially during the duty cycle of the system. Additionally, during the duty cycle of the system, the aircraft will vary dramatically in altitude. This results in significant changes in ambient pressure and significant variations in the inlet conditions to the compressor. This is distinct from known induction motor driven compressor systems wherein the systems are of fixed speed. However, in the present invention the speed of motor 28 and thus the drive shaft 32 varies dramatically through the duty cycle that the system operates. It is important to note that in the present system the electrical output from generator 22 is directly applied to motor 28 in an unconditioned state. That is, no power inverter or other electronic conditioning of the electrical power delivered to the motor is included. This nonrectified, noninverted power supply, due to the utilization of a permanent magnet generator and induction motor as noted previously, still allows the induction motors to start from zero speed upon closure of the contacts 26 and follow the curve of power delivered thereto to gradually reach operational speed. More particularly the low slip electromagnetic design allows motor 28 to closely track the output frequency of generator 22 when operating at rated conditions.

Rotation of shaft 34 by motor 28 drives compressors 48, 50 to draw in air through inlet 20 from the chamber cavity 18. It will be appreciated that the compressors are operating as suction compressors, developing a vacuum-like, lower-than-ambient pressure in cavity 18 to draw in boundary layer air flow through openings 16. During an initial part of the flight of the aircraft, it is carrying maximum weight and fuel load, and engine 12 is operating at a near maximum speed. This causes maximum speed of the compressors 48, 50. Guide vane control 54 is operable in response to sensors 80, 82 to maintain the ratio $\Delta P/P$ substantially constant. Accordingly, the guide vane control 54 adjusts the inlet guide vanes 53 to partially closed positions for preswirling the air flow entering the compressor 30 to prevent the ratio $\Delta P/P$ from exceeding a preselected value. Typically the preselected value may be in the range of 0.44 to 0.55 to assure adequate suctioning of the boundary layer air flow.

During a later portion of the flight the aircraft weight is lower and the spool speed of engine 12 is also lower. To compensate for the reduced speed of compressors 48, 50, the guide vane control 54 acts to open the inlet guide vanes 53 to maintain a preselected value of the ratio $\Delta P/P$. It will be apparent to those skilled in the art, that the control also operates to adjust the inlet guide vanes as altitude and ambient pressure varies. The preswirl introduced by the vanes has the additional benefit of largely eliminating the compressor-speed-cubed effect on compressor load.

To avoid low volume surge during operation of the compressor system, the present invention further includes the surge control 78 and associated valves 79. In the event the volumetric flow rate passing through compressors 48, 50 starts to approach a preselected minimum which is generally associated with impending compressor stall, control 78 senses this lower volumetric flow rate through sensors 84, 86 and acts to open valve 79 such that ambient air flow is delivered through conduit 76 to the inlet to the compressor. Instances of such low volumetric flow rate are normally associated with compressor operation either below its minimum design speed or when the aircraft is operating below a minimum design flight MACH number. Though not illustrated, a safety feature may be included in the form of an over temperature switch associated with motor 28 which is operable to prevent excessive power draw and associated over temperature of the system. This may occur, for instance, during operation of the compressor below the minimum design altitude for the aircraft wherein the higher air density may cause an increase in the load on motor 28. As a further preferred feature, the arrangement may include a second switch 27 connectable to a ground check out module.

In this manner the present invention provides a compressor suction system for drawing adequate boundary layer flow off of the external aircraft surface 14 at varying altitudes, and throughout the flight envelope that the aircraft experiences. For example, by utilization of the inlet guide vanes, the system is operable to maintain the desired ratio of ΔP/P through a variety of ambient pressures, such as from 28,000 to 41,000 feet altitude. Further, the system is operable to compensate for variations in compressor speed from about 23,000 to 30,000 rpm, as may be experienced during the duty cycle of the aircraft.

Various alterations and modifications of the present invention will be apparent to those skilled in the art. Accordingly, the foregoing detailed description of the preferred embodiment of the invention should be considered exemplary in nature and not as limiting to the scope and spirit of the invention as set forth in the appended claims.

Having described the invention with sufficient clarity that those skilled in the ad may make and use it, what is claimed is:

1. A suctioning system for drawing a high volume of an ambient fluid flow at a low ambient pressure P, comprising:
    a variable speed, mechanically driven, permanent magnet generator with a low reactance, variable voltage, variable frequency, alternating electrical current output;
    an electrical induction motor directly connectable to receive said output from said generator in an unconditioned state and drive an output shaft associated with the motor;
    a suction compressor having an inlet receiving the ambient fluid flow and rotatably driven by said shaft to suction said ambient fluid flow; and
    adjustable inlet guide vanes at said inlet for variably preswirling said ambient fluid flow before reaching said compressor; and
    control means for adjusting said guide vanes to maintain ΔP/P substantially constant, where:
    ΔP=(ambient pressure−compressor inlet pressure).

2. A suctioning system for drawing a high volume flow of low pressure boundary layer airflow through a plurality of openings on an external surface of an aircraft into an enclosed cavity within the external surface, comprising:
    an electrical generator adapted to be driven at variable speeds;
    an electrical induction motor directly connectable to said generator to rotatably drive an output shaft at variable speeds;
    a suction compressor having an inlet and being rotatably driven by said shaft at variable speeds to draw airflow into said inlet;
    a first conduit extending from said cavity to said inlet, whereby said compressor draws said boundary layer into said cavity;
    adjustable guide vanes at said inlet for variably preswirling airflow delivered to said inlet;
    a second conduit for delivering ambient airflow to said inlet in parallel flow relation to that in said first conduit;
    a surge control valve in said second conduit for opening and closing communication of said inlet with the ambient airflow; and
    control means for adjusting said guide vanes and for opening and closing said surge control valve.

3. A suctioning system as set forth in claim 2, wherein said control means is operable to adjust said guide vanes to maintain ΔP/P substantially constant, where:
    ΔP=(ambient pressure−compressor inlet pressure) and
    P=compressor inlet pressure.

4. A suctioning system as set forth in claim 3, wherein said control means is operable to open said second conduit to deliver ambient airflow to said inlet to maintain total airflow through said compressor above a preselected minimum.

5. A suctioning system as set forth in claim 2, wherein said control means is operable to open said second conduit to deliver ambient airflow to said inlet to maintain total airflow through said compressor above a preselected minimum.

6. A suctioning system as set forth in claim 2, further including first sensing means for sensing compressor inlet pressure (P), and second sensing means for sensing ambient pressure, said control means responsive to said first and second sensing means to maintain ΔP/P substantially constant, where:
    ΔP=(ambient pressure−compressor inlet pressure).

7. A suctioning system as set forth in claim 6, further including third sensing means for sensing the rate of discharge airflow from said compressor, said control means responsive to said third sensing means to open said second conduit to deliver ambient airflow to said inlet to maintain total airflow through said compressor above a preselected minimum.

8. A suctioning system as set forth in claim 7, wherein said generator is a permanent magnet generator developing a low reactance, variable frequency, variable voltage, multi-phase, sine wave, alternating current electrical output power in an unconditioned state and about 100 kilowatts.

9. A suctioning system as set forth in claim 8, wherein said induction motor is a multi-phase synchronous induction motor directly connectable to receive said output power in said unconditioned state and to rotate said power output shaft.

10. A suctioning system as set forth in claim 2, wherein said generator is a permanent magnet generator with a low reactance, variable frequency, variable voltage, three-phase, sine wave, alternating current electrical output power in an unconditioned state and about 100 kilowatts.

11. A suctioning system as set forth in claim 10, wherein said induction motor is directly connectable to receive said output power in said unconditioned state and to rotate said power output shaft.

12. A suctioning system adapted to draw a high volume flow of low pressure boundary layer airflow through a plurality of openings on an external surface of an aircraft into an enclosed cavity within the external surface, comprising:

an electrical generator adapted to be directly driven by an engine on the aircraft at variable speeds;

an electrical induction motor directly connectable to said generator to rotatably drive an output shaft at variable speeds;

a suction compressor having an inlet and being rotatably driven by said shaft at variable speeds to draw airflow into said inlet;

a first conduit adapted to deliver airflow from said cavity to said inlet, whereby said compressor is adapted to draw the boundary layer airflow into said cavity;

adjustable guide vanes at said inlet for variably preswirling airflow delivered to said inlet;

a second conduit adapted to deliver ambient airflow to said inlet in parallel flow relation to that in said first conduit;

a surge control valve in said second conduit for opening and closing communication of said inlet with the ambient airflow; and control means for adjusting said guide vanes and for opening and closing said surge control valve.

13. A suctioning system as set forth in claim 12, further including first sensing means for sensing compressor inlet pressure (P), and second sensing means for sensing ambient pressure, said control means responsive to said first and second sensing means to maintain $\Delta P/P$ substantially constant, where:

$\Delta P$=(ambient pressure−compressor inlet pressure).

14. A suctioning system as set forth in claim 13, further including third sensing means for sensing the rate of discharge airflow from said compressor, said control means responsive to said third sensing means to open said second conduit to deliver ambient airflow to said inlet to maintain total airflow through said compressor above a preselected minimum.

15. A suctioning system as set forth in claim 14, wherein said generator is a permanent magnet generator with a low reactance, variable frequency, variable voltage, multi-phase, sine wave, alternating current electrical output power in an unconditioned state and about 100 killowatts.

16. A suctioning system as set forth in claim 15, wherein said induction motor is a multi-phase synchronous induction motor directly connectable to receive said output power in said unconditioned state and to rotate said output shaft.

17. In combination with an aircraft having a propulsion engine, an external surface with a plurality of openings therein, and an internal chamber for drawing boundary layer airflow from said external surface through said openings, a boundary layer airflow suctioning system, comprising:

an electrical generator directly driven by the aircraft engine at variable speeds;

an electrical induction motor directly connected to said generator to rotatably drive an output shaft at variable speeds;

a suction compressor having an inlet and being rotatably driven by said shaft at variable speeds to draw airflow into said inlet;

a first conduit extending from said chamber to said inlet, whereby said compressor draws said boundary layer airflow into said chamber;

adjustable guide vanes at said inlet for variably preswirling airflow delivered to said inlet;

a second conduit for delivering ambient airflow to said inlet in parallel flow relation to that in said first conduit;

a surge control valve in said second conduit for opening and closing communication of said inlet with the ambient airflow; and control means for adjusting said guide vanes and for opening and closing said surge control valve.

18. A combination as set forth in claim 17, wherein said control means is operable to adjust said guide vanes to maintain $\Delta P/P$ substantially constant, where:

$\Delta P$=(ambient pressure−compressor inlet pressure) and

P=compressor inlet pressure.

19. A combination as set forth in claim 18, wherein said control means is operable to open said second conduit to deliver ambient airflow to said inlet to maintain total airflow through said compressor above a preselected minimum.

* * * * *